US012623148B2

(12) United States Patent
Liu

(10) Patent No.: US 12,623,148 B2
(45) Date of Patent: May 12, 2026

(54) METHOD AND APPARATUS FOR CONTROLLING VIRTUAL OBJECT, AND STORAGE MEDIUM

(71) Applicant: TENCENT TECHNOLOGY (SHENZHEN) COMPANY LIMITED, Shenzhen (CN)

(72) Inventor: Zhihong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 353 days.

(21) Appl. No.: 17/946,724

(22) Filed: Sep. 16, 2022

(65) Prior Publication Data

US 2023/0019216 A1     Jan. 19, 2023

Related U.S. Application Data

(63) Continuation of application No. PCT/CN2021/112846, filed on Aug. 16, 2021.

(30) Foreign Application Priority Data

Sep. 18, 2020     (CN) ........................ 202010988341.X

(51) Int. Cl.
*A63F 13/55* (2014.01)
*A63F 13/52* (2014.01)
*A63F 13/837* (2014.01)
(52) U.S. Cl.
CPC .............. *A63F 13/55* (2014.09); *A63F 13/52* (2014.09); *A63F 13/837* (2014.09); *A63F 2300/8076* (2013.01)

(58) Field of Classification Search
CPC ........ A63F 13/55; A63F 13/52; A63F 13/837; A63F 2300/8076
See application file for complete search history.

(56) References Cited

U.S. PATENT DOCUMENTS

2004/0233171 A1* 11/2004 Bell ........................ G06T 19/20
345/168
2019/0371034 A1   12/2019 Feghali et al.

FOREIGN PATENT DOCUMENTS

CN       107789837 A     3/2018
CN       109999499 A     7/2019
(Continued)

OTHER PUBLICATIONS

Classic World of Warcraft Totem Guide Posted by Defcamp & Melderon TV https://www.youtube.com/watch?v=ZkO9EOezu8o Posted on Jan. 31, 2019 (Year: 2019).*
(Continued)

*Primary Examiner* — Jeffrey K Wong
(74) *Attorney, Agent, or Firm* — Sughrue Mion, PLLC

(57) ABSTRACT
A method and an apparatus for controlling a virtual object, a storage medium, and an electronic device. The method includes: obtaining an interactive operation in a virtual scene, the interactive operation being used for controlling a first virtual object to release a virtual prop at a target position; releasing the virtual prop at the target position, and displaying a target region triggered by the virtual prop in the virtual scene, the target region including the target position; and enhancing a target attribute of a virtual object in a first object group in the virtual scene in a case that the first virtual object is located in the target region, the first object group being an object group to which the first virtual object belongs.

20 Claims, 13 Drawing Sheets

(56) References Cited

FOREIGN PATENT DOCUMENTS

| CN | 110465090 | A | 11/2019 |
| CN | 111228805 | A | 6/2020 |
| CN | 111589126 | A | 8/2020 |
| CN | 112121428 | A | 12/2020 |

OTHER PUBLICATIONS

Overwatch Mercy Guide Posted by LowkoTV https://www.youtube.com/watch?v=Bg3t4be5Zsg Posted on Aug. 25, 2015 (Year: 2015).*
Overwatch review Posted by Nic Healey https://www.cnet.com/reviews/overwatch-preview/ Posted on Mar. 9, 2016 (Year: 2016).*
WoW Resto Shaman BFA: Should You Play Restoration Shaman In 8.1? Posted by MarcelianOnline Dec. 4, 2018 https://www.youtube.com/watch?v=oMho8NmJHo0 (Year: 2018).*
Article: After a 6-year break, I'm playing World of Warcraft again. Here's why Posted by Eric Franklin Nov. 4, 2016 https://www.cnet.com/tech/computing/world-of-warcraft-legion-brought-me-back/ (Year: 2016).*

Team Fortress 2 Review May 14, 2013 Written by Charles Onyett https://www.ign.com/articles/2007/10/09/team-fortress-2-review (Year: 2007).*
Youtube video "The Secret Medic Tricks" Mar. 29, 2017 Posted by ArraySeven https://www.youtube.com/watch?v=OS4kZ8olQMU (Year: 2017).*
Team Fortress Review (Year: 2007).*
Youtube video 'The Secret Medic Tricks' (Year: 2017).*
"Storm hero Skill Introduction", Venna, Bouleen Experience, Aug. 26, 2018, 2 Pages, https://jingyan.baidu.com/article/ce09321bbe5ed92bff858f29.
"How is the Sow is the Sow is the Sow is the Sow is the Sow is the Sow is the Sow is the same", the current garden software, Aug. 6, 2015, 2 pages, http://www.downxia.com/zixum/523.
Chinese Office Action for 202010988341.X dated Sep. 28, 2021.
Chinese Office Action for 202010988341.X dated Apr. 18, 2022.
International Search Report for PCT/CN2021/112846 dated Nov. 17, 2021 (PCT/ISA/210).
Written Opinion of the International Searching Authority for PCT/CN2021/112846 dated Nov. 17, 2021 (PCT/ISA/237).

* cited by examiner

Obtain an interactive operation in a virtual scene, the interactive operation being used for controlling a first virtual object to release a virtual prop at a target position

S202

Release the virtual prop at the target position, and display a target region triggered by the virtual prop in the virtual scene, the target region including the target position

S204

Enhance a target attribute of a virtual object in a first object group in the virtual scene in a case that the first virtual object is located in the target region, the first object group being an object group to which the first virtual object belongs

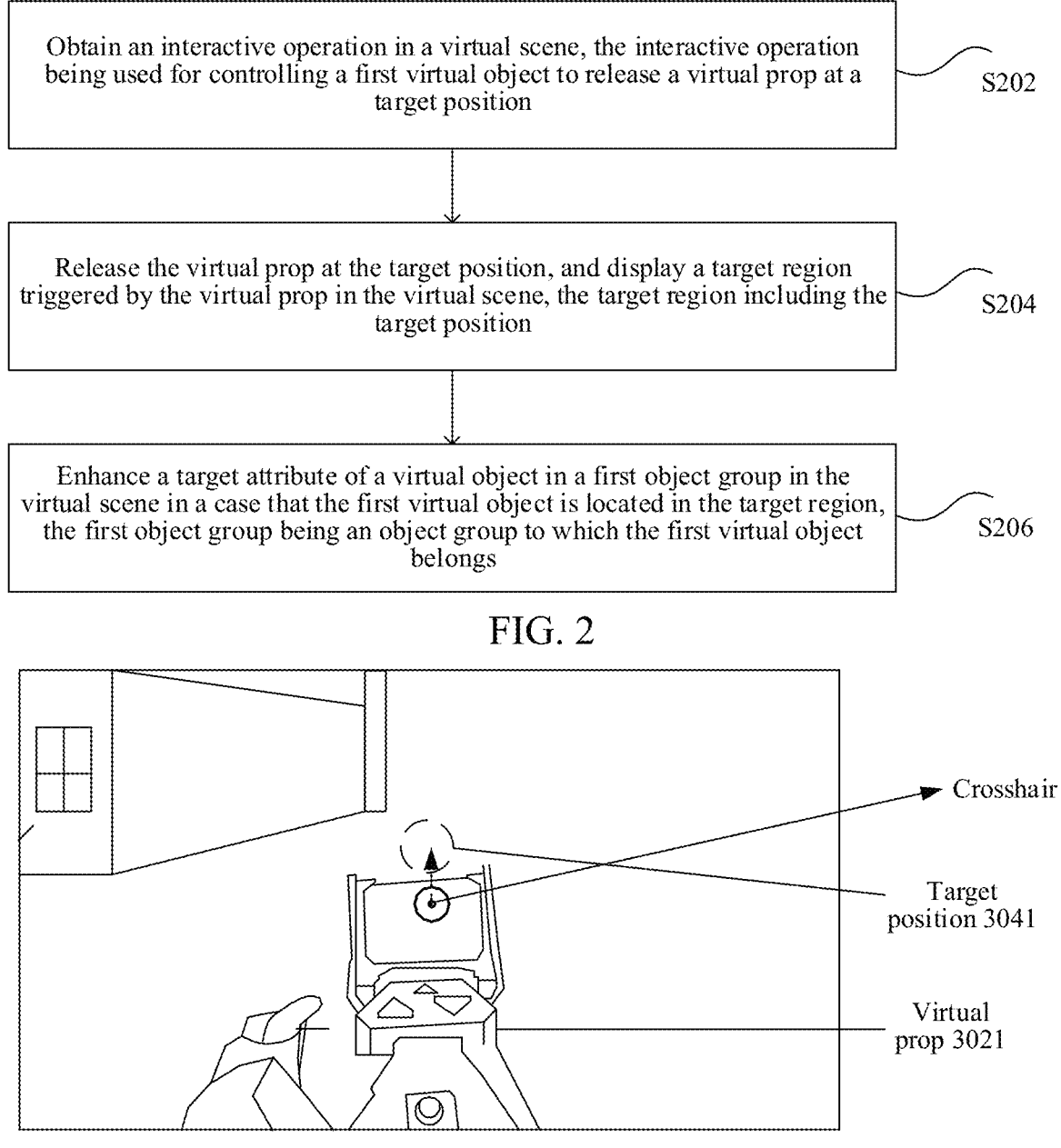

Crosshair

Target position 3041

Virtual prop 3021

FIG. 3A

Target
position 3042

Target
region 3062

Virtual prop
3022

First virtual object 402

Virtual object 408 in a
first object group

Virtual prop
404

Target region
406

First virtual object 402

Virtual prop 404

Target region 406

Virtual object 1002 in a second object group

Orientation identifier 1004

Obstacle          Ray

Small plane

Indicator identifier

Indicator identifier

Mini map

B

First obtaining unit 1602

Response unit 1604

First enhancement unit 1606

Apparatus for controlling a virtual object

METHOD AND APPARATUS FOR CONTROLLING VIRTUAL OBJECT, AND STORAGE MEDIUM

CROSS-REFERENCE TO RELATED APPLICATION(S)

This application is a continuation application of International Application No. PCT/CN2021/112846, filed on Aug. 16, 2021, which claims priority to Chinese Patent Application No. 202010988341.X filed with the China National Intellectual Property Administration on Sep. 18, 2020, the disclosures of which are incorporated by reference in their entireties.

FIELD

The disclosure relates to the field of computers, and specifically, to a method and apparatus for controlling a virtual object, a storage medium, and an electronic device.

BACKGROUND

In a virtual scene, a plurality of virtual props are often configured for a current virtual object controlled by a user. In the solution provided in the related art, another virtual object (different from the current virtual object) may only be affected by the virtual prop within an action range of the virtual prop, and the virtual prop does not have any effect in a case that the another virtual object is located beyond the action range of the virtual prop.

In other words, in a case that the user intends to control the another virtual object by using the virtual prop, due to the operation having high operational limitation, the user needs to first control the current virtual object to move to ensure that the another virtual object is located with the action range of the virtual prop held by the current virtual object, and then release the virtual prop within the action range, thereby achieving controlling of the another virtual object. That is to say, other additional preparation operations are usually also required in a case that the another virtual object is controlled through the current virtual object, which increases operation complexity in a process of controlling the virtual object, resulting in low efficiency of controlling the virtual object.

For the foregoing problem, no effective solution has been provided yet.

SUMMARY

An embodiment the disclosure may provide a method for controlling a virtual object, performed by an electronic device, the method including: obtaining an interactive operation in a virtual scene, the interactive operation being used for controlling a first virtual object to release a virtual prop at a target position; releasing the virtual prop at the target position, and displaying a target region triggered by the virtual prop in the virtual scene, the target region including the target position; and enhancing a target attribute of a virtual object in a first object group in the virtual scene in a case that the first virtual object is located in the target region, the first object group being an object group to which the first virtual object belongs.

In some embodiments an apparatus for controlling a virtual object may be provided, the apparatus including: a first obtaining unit, configured to obtain an interactive operation in a virtual scene, the interactive operation being used for controlling a first virtual object to release a virtual prop at a target position; a response unit, configured to release the virtual prop at the target position, and display a target region triggered by the virtual prop in the virtual scene, the target region including the target position; and a first enhancement unit, configured to enhance a target attribute of a virtual object in a first object group in the virtual scene in a case that the first virtual object is located in the target region, the first object group being an object group to which the first virtual object belongs.

Some embodiments may further provide a non-transitory computer-readable storage medium, storing a computer program, the computer program being configured to perform, when run, the method for controlling a virtual object provided.

Some embodiments may further provide an electronic device, including a memory, a processor, and a computer program stored in the memory and executable on the processor, the processor performing, through the computer program, the method for controlling a virtual object.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

FIG. 2 is a schematic flowchart of a method for controlling a virtual object according to some embodiments.

FIG. 3A is a schematic diagram of a target position according to some embodiments.

DESCRIPTION OF EMBODIMENTS

Figure 1:
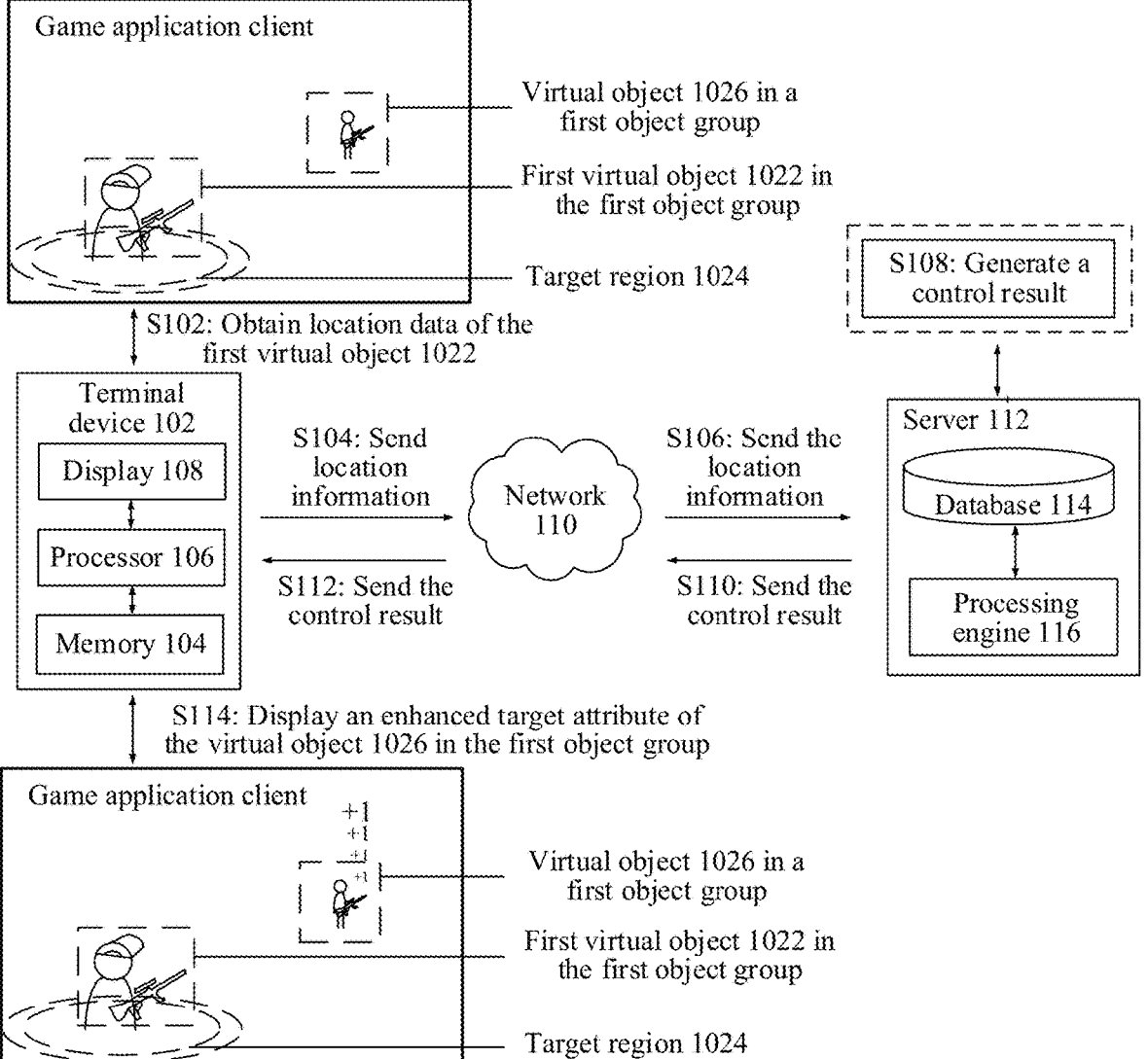
FIG. 1 is a schematic diagram of an application environment of a method for controlling a virtual object according some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

In this specification, the claims, and the accompanying drawings, the terms "first", "second", and so on are intended to distinguish similar objects but do not necessarily indicate a specific order or sequence. It is to be understood that the data termed in such a way is interchangeable in proper circumstances, so that the embodiments described herein can be implemented in other sequences than the sequence illustrated or described herein. Moreover, the terms "include", "contain", and any other variants thereof mean to cover the non-exclusive inclusion. For example, a process, method, system, product, or device that includes a list of steps/operations or units is not necessarily limited to those steps/operations or units that are clearly listed, but may include other steps/operations or units not expressly listed or inherent to such a process, method, system, product, or device. In the following description, the term "a plurality of" means at least two.

Before the embodiments are further described in detail, a description is made on nouns and terms in the embodiments of the disclosure, and the nouns and terms are applicable to the following explanations.

(1) Virtual scene: A scene different from a real world that is outputted by using an electronic device. Visual perception of the virtual scene can be formed with the aid of naked eyes or devices, for example, by using two-dimensional images outputted by using a display screen or three-dimensional images outputted by using a three-dimensional display technology such as a three-dimensional projection, virtual reality, or augmented reality technology. In addition, a variety of perception simulating the real world such as auditory perception, tactile perception, olfactory perception, and motion perception can be further formed by using a variety of possible hardware. The virtual scene may be a simulated environment of a real world, or may be a semi-simulated semi-fictional virtual environment, or may be an entirely fictional virtual environment. The virtual scene may be any one of a two-dimensional virtual scene, a 2.5-dimensional virtual scene, or a three-dimensional virtual scene, and the dimension of the virtual scene is not limited in the embodiments. For example, the virtual scene may include the sky, the land, the ocean, or the like. The land may include environmental elements such as the desert and a city, and a virtual object may be controlled by a user or artificial intelligence to perform a behavior such as interaction in the virtual scene.

(2) Virtual object: A character of each person and thing that may perform interaction in the virtual scene, or a movable object in the virtual scene. The movable object may be a virtual character, a virtual animal, a cartoon character, or the like, for example, a character, an animal, a plant, an oil drum, a wall, or a stone displayed in a virtual scene. The virtual object may be a virtual image used for representing a user in the virtual scene. The virtual scene may include a plurality of virtual objects, and each virtual object has a shape and a volume in the virtual scene, and occupies some space in the virtual scene.

For example, the virtual object may be a player character controlled through an operation performed on a client, or may be an artificial intelligence (AI) character set in a virtual scene battle through training, or may be a non-player character (NPC) set in virtual scene interaction. For example, the virtual object may also be a virtual character performing interaction in an adversarial manner in the virtual scene. In some embodiments, the user may control the virtual object to interact with another virtual object by using a virtual prop, and the type of the virtual prop is not specifically limited thereto.

FIG. 1 is a schematic diagram of an application environment of a method for controlling a virtual object according some embodiments. The method for controlling a virtual object provided in some embodiments is applicable to, but not limited to, an environment shown in FIG. 1. The environment may include a terminal device 102, a network 110, and a server 112. For ease of understanding, the description is made below by using an example in which the virtual scene is provided through a game application, but the virtual scene is not limited thereto. For example, the terminal device 102 runs a game application client supporting login of a target user account. The terminal device 102 may include a display 108, a processor 106, and a memory 104. The display 108 may be configured to display a game interface (that is, an interface for displaying a virtual scene) of a game application run by a game application client. The game interface may display, a first virtual object 1022 in a first object group, a virtual object 1026 in the first object group (where the virtual object 1026 is different from the first virtual object 1022), and a target region 1024, where the first virtual object 1022 in the first object group is a virtual object currently controlled by the game application client, and the target region 1024 is a display region obtained by controlling, by the game application client, the first virtual object 1022 in the first object group to release a virtual prop.

An example embodiment may be shown in the following operations, and the description is made below with reference to each operation.

In operation S102, the game application client that supports the login of the target user account is run by the terminal device 102, and a game picture (that is, a picture of the virtual scene) of the game application of the game application client is displayed on the display 108 of the terminal device 102. Based on this, location data of the first virtual object 1022 is acquired.

In operations S104 to S106, the terminal device 102 sends location information (including the location data of the first virtual object 1022) to the server 112 through the network 110.

In operation S108, the server 112 searches location data of the target region through the database 114, and compares the location data of the target region with the location data of the first virtual object 1022 in the location information through a processing engine 116, to generate a control result. In a case that a comparison result indicates that the first virtual object 1022 is located in the target region 1024, the control result is used for instructing to enhance a target attribute of the virtual object 1026 that belongs to the same group as the first virtual object 1022.

In operations S110 to S112, the server 112 sends the control result to the terminal device 102 through the network 110.

In operation S114, the processor 106 in the terminal device 102 displays, according to the control result, a process or result of controlling (enhancing the target attribute) the virtual object 1026 in the first object group through the display 108, and stores enhanced attribute information of the virtual object 1026 in the first object group in the memory 104.

In some embodiments, using an example in which the electronic device is a terminal device, the method for controlling a virtual object provided in some embodiments may also be implemented by the terminal device. For example, the game application may be an offline game application, and related processing involved (excluding interaction between the terminal device 102 and the server 112) in operations S102 to S114 may be locally implemented in the terminal device 102.

The method for controlling a virtual object provided in some embodiments is described below. FIG. 2 is a schematic flowchart of a method for controlling a virtual object according to some embodiments. As shown in FIG. 2, the method may include the following operations:

S202: Obtain an interactive operation in a virtual scene, the interactive operation being used for controlling a first virtual object to release a virtual prop at a target position.

S204: Release the virtual prop at the target position and display a target region triggered by the virtual prop in the virtual scene, the target region including the target position.

S206: Enhance a target attribute of a virtual object in a first object group in the virtual scene in a case that the first virtual object is located in the target region, the first object group being an object group to which the first virtual object belongs.

In some embodiments, the virtual object control method is applicable to, but is not limited to, a game application, such as a shooting game application. For example, in a round of a shooting game task run by the shooting game application, virtual objects participating in the shooting game task are divided into a plurality of groups (that is, object groups), where virtual objects in the same group may cooperate to complete the shooting game task, or cooperate to defeat virtual objects in another group. The virtual prop may be a skill weapon used to be released in the target region. In an embodiment, in a case that the first virtual object controlled by the user is detected to be located in the target region, a target attribute of another virtual object in the same group as the first virtual object is enhanced, so that the enhancement of the target attribute of the another virtual object may ignore the distance, the range, and other limiting factors, thereby greatly reducing a limitation on the enhancement of the target attribute of the another virtual object. In this way, the another virtual object may be controlled without relying on complex operations, thereby improving the efficiency of controlling the virtual object.

In some embodiments, the game application may be a multiplayer online battle arena (MOBA) application or a single-player game (SPG) application. The type of the game application may include, but is not limited to, at least one of the following: a two-dimensional (2D) game application, a three-dimensional (3D) game application, a virtual reality (VR) game application, an augmented reality (AR) game application, or a mixed reality (MR) game application. The foregoing is merely an example of the game application, which is not limited in this embodiment.

In addition, the game application may be a third person shooting (TPS) game application in which a game picture is displayed from a perspective of a third party virtual object other than a virtual object currently controlled by a player, or may be a first person shooting (FPS) game application in which the game picture is displayed from a perspective of the virtual object currently controlled by the player (that is, a first-person perspective). Correspondingly, the first virtual object may be, but is not limited to, a virtual character (which may be also referred to as a player character) controlled by the player through various game application clients, a non-player character (NPC), a prop object (for example, a virtual follower, a virtual pet, and the like) controlled by the foregoing virtual character, and a vehicle object (for example, a virtual vehicle, and the like) controlled by the foregoing virtual character. The foregoing description is merely an example, which is not limited in this embodiment.

In some embodiments, the interactive operation may be configured to control the first virtual object to release the virtual prop. A release manner of the virtual prop may be related to the type of the virtual prop. For example, the virtual prop is of a gun type, the release manner of the virtual prop may be firing a bullet (or a shell), and determining an effect display position after release of the virtual prop according to a situation where the fired bullet (or the shell) collides with another collision element (for example, a ground, a human body, a wall, or the like).

In some embodiments, the target position may be a position at which a crosshair of the virtual prop aims, or may be a position of the first virtual object in a case that the first virtual object is controlled to release the virtual prop (that is, in a case that the interactive operation is performed).

In addition, the target position may also be an effect display position after the virtual prop is released. For example, as shown in FIG. 3A, a virtual prop 3021 is a virtual prop (which may be configured or obtained in advance) currently held by the first virtual object (a virtual object controlled in the first-person perspective), and a position at which a crosshair of the virtual prop 3021 aligns (or aims) is a target position 3041, where a release direction of the virtual prop 3021 is a current direction aligned by the crosshair. Based on this, in a case that the virtual prop 3021 is controlled to be released, it may indicate that the virtual prop 3021 is released at the target position 3041.

Figure 3B:
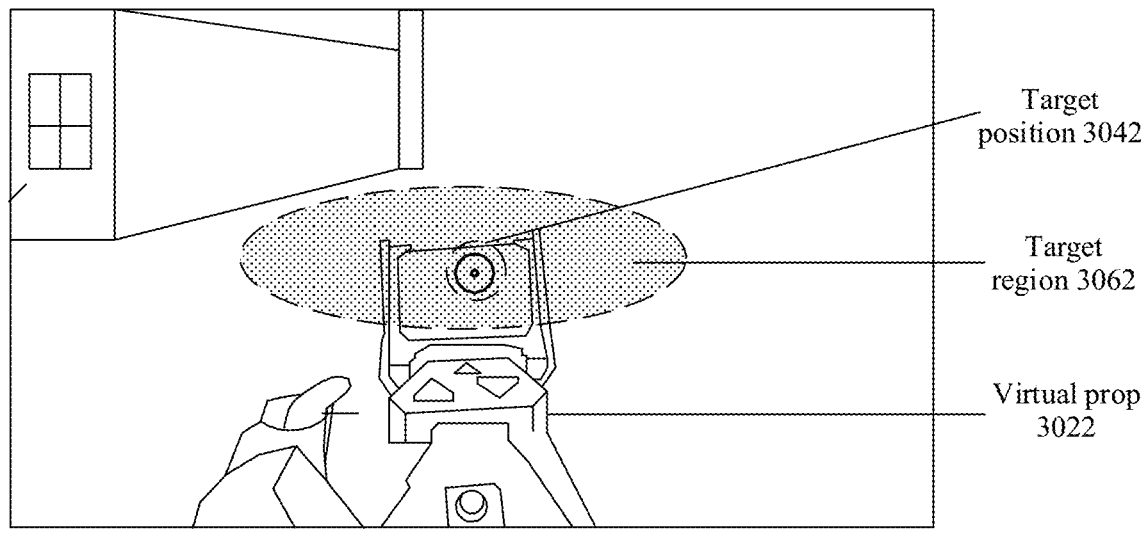
FIG. 3B is a schematic diagram of a target position and a target region according to some embodiments.

In some embodiments, the target region may be, but is not limited to, a region centered on the target position, and the target region may also be, but is not limited to, an effect display region after the virtual prop is released. FIG. 3B shows a target region 3062 (that is, an effect display region) determined after a virtual prop 3022 is released, where a target position 3042 is displayed in the target region 3062, and the target position 3042 may be a center of the target region 3062. In addition, the target position 3042 may be determined, but is not limited to, a release manner (which includes a crosshair, a direction, a position, and the like) of the virtual prop 3022. In other words, display of the target region 3062 may be determined by controlling the release of the virtual prop 3022. For example, the target position 3042 includes a position at which a ray directed by a crosshair of the virtual prop 3022 contacts with the first contacted virtual item (for example, a ground), so that the player may select to determine the target region 3062 in a region where the first virtual object is currently located, and there is no need for the player to control the first virtual object to perform unnecessary movement operations, thereby reducing the complexity of operations during controlling of the virtual object.

Figure 4:
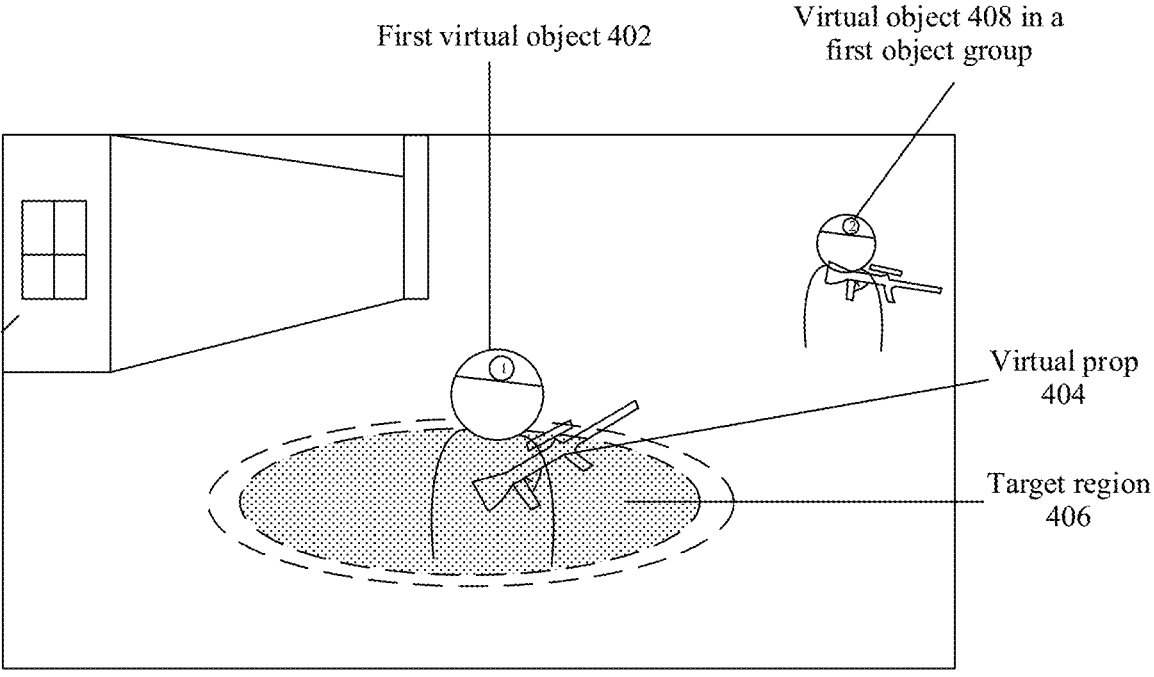
FIG. 4 is a schematic diagram of a virtual scene picture according to some embodiments.

In some embodiments, FIG. 4 shows a game picture (that is, a picture of a virtual scene) of a first virtual object 402 in a target region 406, where the target region 406 is obtained by controlling the first virtual object 402 to release a configured virtual prop 404.

In addition, FIG. 4 further displays a virtual object 408 that belongs to the same first object group as the first virtual object 402 and is different from the first virtual object 402. The virtual object 408 and the first virtual object 402 jointly perform the same virtual task, for example, killing a virtual object in another object group.

Figure 5:
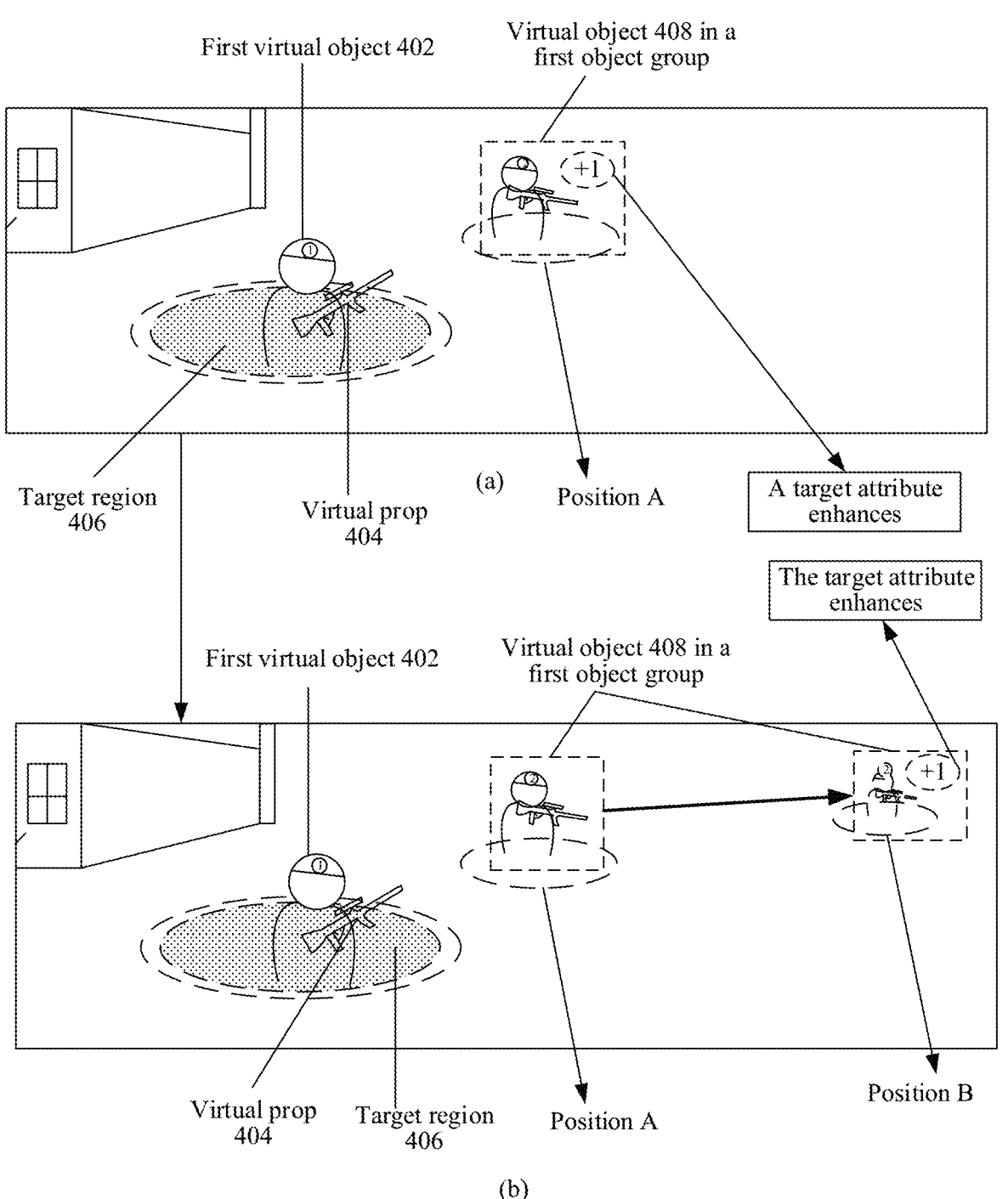
FIG. 5 is a schematic diagram of enhancing a target attribute according to some embodiments.

In some embodiments, based on FIG. 4, a game picture that a target attribute of the virtual object 408 in the first object group is enhanced in the virtual scene may be shown in FIG. 5(a), where the game picture shown in FIG. 5(a) may indicate that the target attribute of the virtual object 408 belonging to the same first object group as the first virtual object 402 is enhanced in a case that the first virtual object 402 is located in the target region 406.

In some embodiments, an enhancement parameter (including at least one of an enhancement duration or an enhancement amplitude) of the target attribute may be related to an attribute parameter of the virtual prop 404, for example, a higher quality of the virtual prop 404 indicates a higher enhancement amplitude of the target attribute.

In some embodiments, the enhancement parameter of the target attribute may be related to a duration for which the first virtual object 402 remains in the target region 406. For example, an enhancement duration of the target attribute is consistent with the duration for which the first virtual object 402 remains in the target region 406. In another example, an enhancement amplitude of the target attribute may be in a positive correlation with the duration or which the first virtual object 402 remains in the target region 406.

In some embodiments, enhancement of the target attribute may include increasing a target parameter, for example, increasing a movement speed, health points, a quantity of accessories (such as bullets), a defense value, and the like, and further includes decreasing a negative status parameter, for example, decreasing a target parameter decrease amplitude due to a negative status, and the like In some embodiments, enhancement of the target attribute may be related to whether the first virtual object 402 is located in the target region 406 and not related to a position of the virtual object 408. For example, in the game picture shown in FIG. 5(a), the target attribute of the virtual object 408 at a position A may be enhanced in a case that the first virtual object 402 is located in the target region 406. In a game picture shown in FIG. 5(b), in a case that the first virtual object 402 is still located in the target region 406, the target attribute of the virtual object 408 at the position B may be enhanced even if the virtual object 408 moves from the position A to a position B. In other words, enhancement of the target attribute of the virtual object 408 may not be affected, but is not limited to, location information of the virtual object 408.

In some embodiments, the enhancing a target attribute of a virtual object in a first object group in the virtual scene may also include, but not limited to, the following operations:

1. Enhance the target attribute of the virtual object in the first object group in a case that a first virtual object in the first object group is located in a target region.

2. Enhance the target attribute of the virtual object in the first object group in a case that another virtual object other than the first virtual object in the first object group is located in the target region.

3. Enhance the target attribute of the virtual object in the first object group in a case that the first virtual object in the first object group and a virtual object in the first object group that is different from the first virtual object are simultaneously located in the target region.

The foregoing target attribute is used for indicating an attribute parameter of the virtual object in the virtual scene (for example, in a process of performing the game task), and the target attribute may be enhanced by, but is not limited to increasing or decreasing the attribute parameter. For example, the target attribute is used for indicating hit points, where the virtual object may continue to perform a current game task in the virtual scene in a case that the hit points is non-zero, and the virtual object is forced to exit the current game task in a case that the hit points is zero. The hit points of the virtual object may correspondingly decrease in a case that the virtual object is attacked by another virtual object participating in the game task. The another virtual object performing an attack operation may include, but is not limited to, a virtual object in another group (enemy), a non-player character (NPC) set in the game task, and the like.

In some embodiments, before the virtual prop is released at the target position, it may be determined whether a target position of a to-be-released virtual prop meets a release condition, for example, in a case that the target position is within a to-be-displayed target region after the release of the virtual prop, it indicates that the target position does not meet the release condition. In another example, in a case that the target position includes a region where release is prohibited (for example, a wall, a forest, a sea, and the like), it indicates that the target position does not meet the release condition.

In some embodiments, the method for controlling a virtual object may be, but is not limited to, enhancing all or part of target attributes of virtual objects in a first object group, for example, enhancing a target attribute of a first virtual object, enhancing a target attribute of a virtual object in the first object group that is different from the first virtual object, or simultaneously enhancing the target attribute of the first virtual object and the target attribute of the virtual object in the first object group that is different from the first virtual object.

In some embodiments, in consideration of balance of the virtual scene, some balancing features, but not limited thereto, may be set. For example, in a case that the first virtual object is located in the target region, prompt information is displayed on a client display interface where a virtual object of another object group is located. The prompt information may be used for prompting that the first virtual object is located in the target region, for example, the prompt information may carry the location information of the target region. In another example, in the process of enhancing the target attribute of the virtual object in the first object group in the virtual scene, a stop operation is triggered to stop enhancement of the target attribute. For example, the stop operation may include, but is not limited to, a movement operation (for example, the first virtual object moves outside the target region), an attack operation (for example, the first virtual object is attacked), a task operation (for example, the virtual object in the another object group completes a target task), a field of view obtaining operation (for example, the virtual object in the another object group obtains a display picture in which the first virtual object is located in the target region), a condition meeting operation (for example, an existing duration of the target region reaches a preset duration), and the like.

In some embodiments, the enhancement of the target attribute of the virtual object in the first object group may be related to, but not limited to, an original target attribute or another attribute of the virtual object in the first object group. For example, a stronger original target attribute of the virtual object indicates a smaller enhancement amplitude of the target attribute, and the target attribute is no longer enhanced in a case that the target attribute of the virtual object reaches an upper limit of the attribute. For example, a stronger another attribute of the virtual object indicates a larger enhancement amplitude of the target attribute, where the another attribute is used for indicating that the enhancement amplitude of the target attribute is increased.

Figure 6:
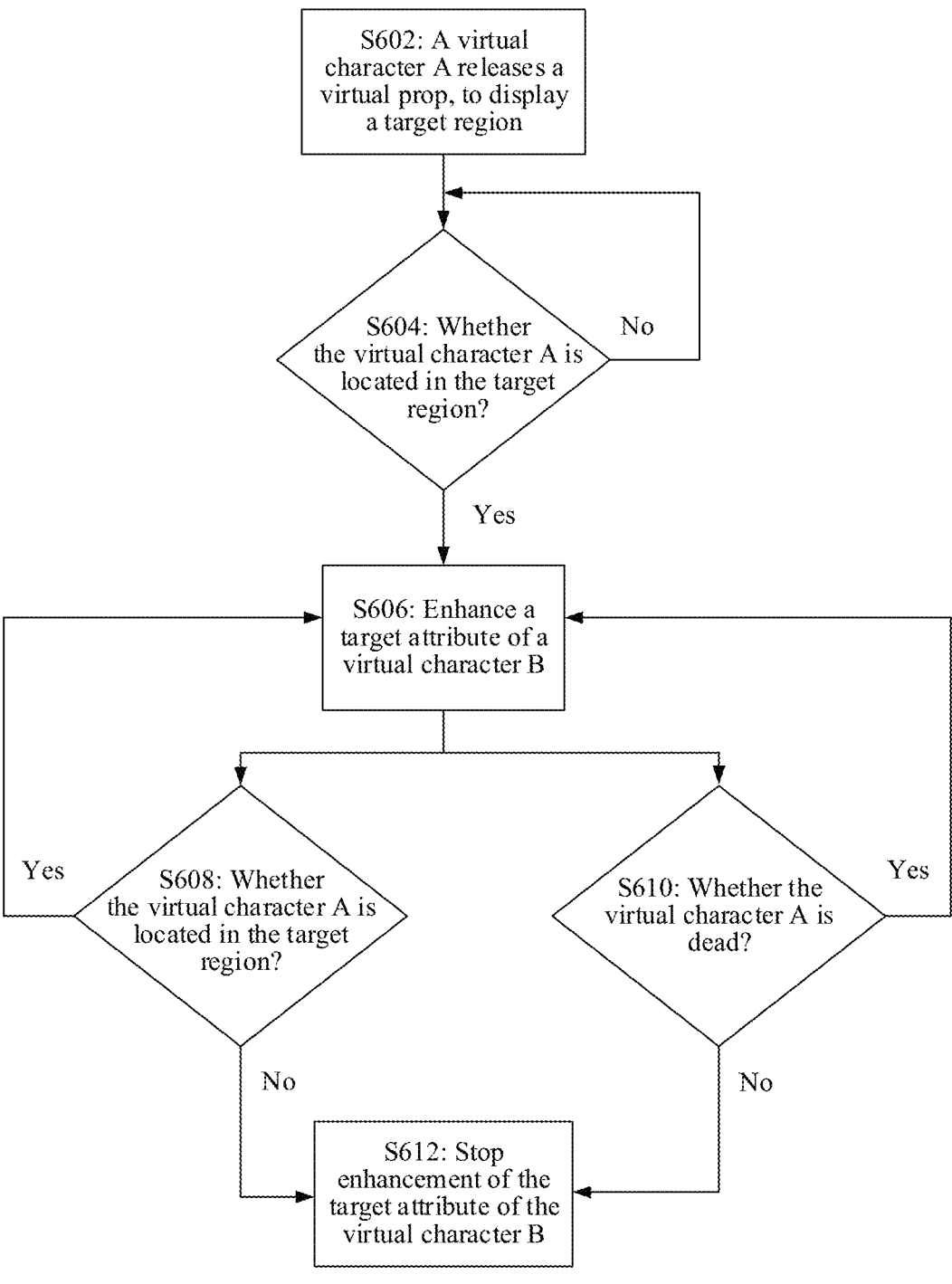
FIG. 6 is a schematic diagram of a method for controlling a virtual object according to some embodiments.

The description is made by using the game application as an example, assuming that a round of game task includes a virtual character A (that is, the first virtual object) and a virtual character B (that is, the virtual object in the first object group that is different from the first virtual object). A process of enhancing a target attribute of a virtual character B by controlling a virtual character A may be shown in FIG. 6, and the process is described below with reference to each operation in FIG. 6.

Operation S602: The virtual character A releases a virtual prop, to display a target region.

Operation S604: Determine whether the virtual character A is located in the target region, if yes, perform operation S606; or if not, continue to perform operation S604.

Operation S606: Enhance a target attribute of the virtual character B.

Operation S608: Determine whether the virtual character A is located in the target region, if yes, perform operation S606; or if not, perform operation S612.

Operation S610: Determine whether the virtual character A is dead, if yes, perform operation S606; or if not, perform operation S612.

Operation S612: Stop enhancement of the target attribute of the virtual character B.

The foregoing description is merely an example. A task of a game may include a plurality of virtual characters, and execution logic shown in the foregoing figure is also an example. This is not limited in this embodiment.

According to some embodiments, the user only needs to control the first virtual object to be located in the target region obtained by releasing the virtual prop, so that target attributes of virtual objects in the same group are enhanced without performing other complex operations, thereby reducing complex operations in the process of controlling the virtual object and achieving the technical effect of improving the efficiency of controlling the virtual object.

In some embodiments, the enhancing a target attribute of a virtual object in a first object group in the virtual scene in a case that the first virtual object is located in the target region includes:

continuously enhancing the target attribute of the virtual object in the first object group in the virtual scene in a case that the first virtual object remains in the target region, where in a case that an attribute value of the target attribute does not reach a preset maximum attribute value, the enhancement amplitude of the target attribute is in a positive correlation with a duration for which the first virtual object remains in the target region.

The enhancement of the target attribute of the virtual object in the first object group is a continuous, and the continuously enhanced enhancement parameter (for example, at least one of the duration or the enhancement amplitude) may be in a positive correlation with, but not limited to, the duration for which the first virtual object remains in the target region. The prerequisite for enhancing the target attribute of the virtual object in the first object group may include that the target attribute of the virtual object in the first object group does not reach the preset maximum attribute value (the upper limit).

Figure 7:
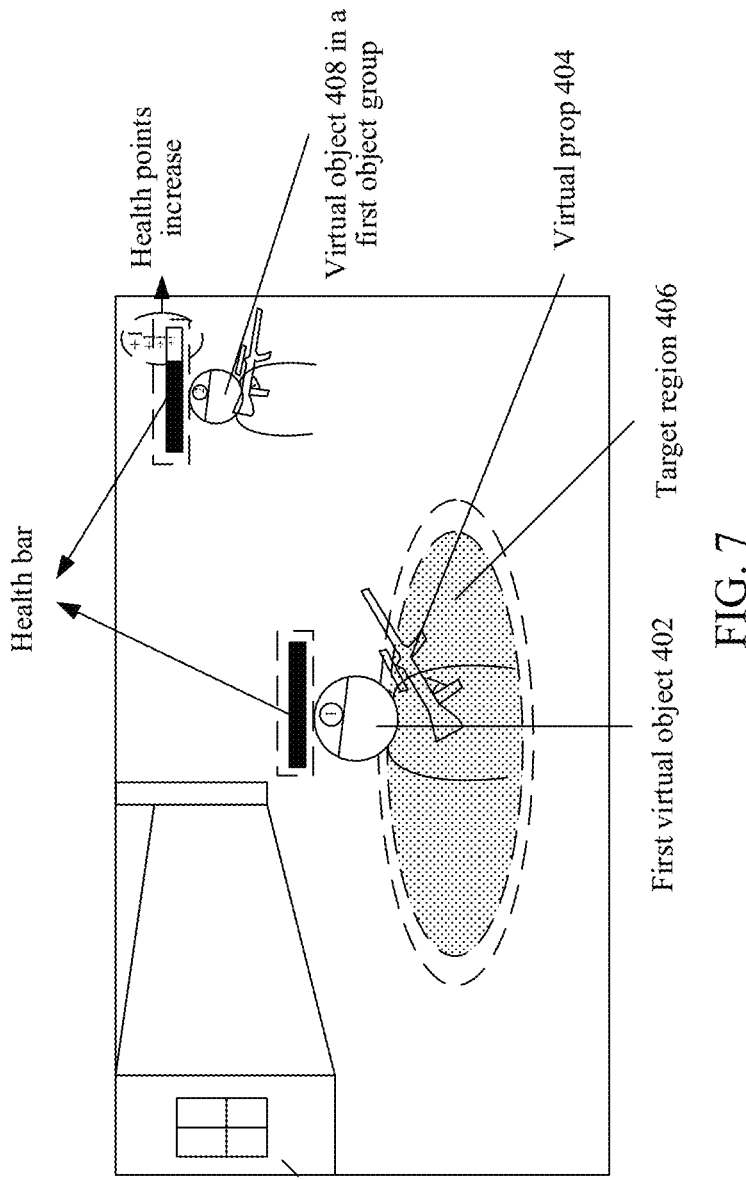
FIG. 7 is a schematic diagram of enhancing heath points according to some embodiments.

Further, for example, based on FIG. 4, a situation of continuously enhancing the target attribute (using health points as an example) of the virtual object 408 in the first object group is shown in FIG. 7, the health points of the virtual object 408 are continuously increased in a case that the first virtual object 402 is located in the target region 406, and the health points of the virtual object 408 (where a black region in a health bar is used for indicating current health points, and a white region is used for indicating a difference between the current health points and an upper limit of the health points) does not reach an upper limit. In some embodiments, the increase of the health points of the virtual object 408 is stopped in a case that the first virtual object 402 leaves the target region 406 or the health points of the virtual object 408 reaches the upper limit.

According to some embodiments, the target attribute may be continuously and greatly enhanced in a case that a preset condition is met, thereby achieving the effect of improving the efficiency of enhancing the target attribute.

In some embodiments, the enhancing a target attribute of a virtual object in a first object group in the virtual scene in a case that the first virtual object is located in the target region includes: enhancing the target attribute of the virtual object in the first object group in the virtual scene at a first amplitude in a case that the first virtual object is located in the target region and a second virtual object is not located in the target region; and the foregoing method may further include: enhancing the target attribute of the virtual object in the first object group in the virtual scene at a second amplitude in a case that the first virtual object is located in the target region and the second virtual object moves to the target region, where the second amplitude is greater than the first amplitude, the second virtual object is a virtual object in the first object group that is different from the first virtual object.

To improve the diversity of a target game, in addition to the first virtual object, another virtual object (for example, the second virtual object) that belongs to the same first object group as the first virtual object may also positively affect the enhancement of the target attribute.

Figure 8:
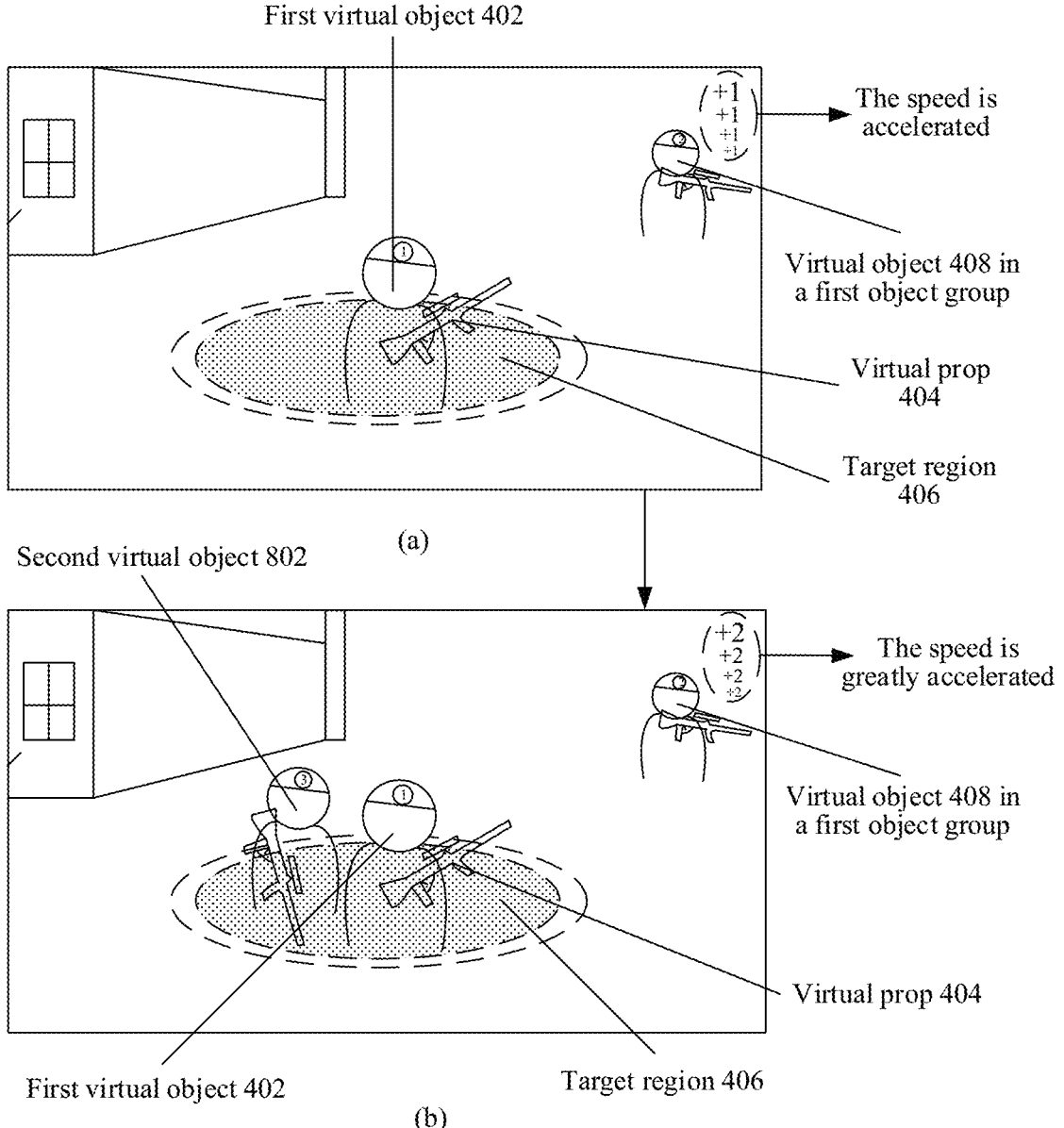
FIG. 8 is a schematic diagram of accelerating a speed at different enhancement amplitudes according to some embodiments.

Further, for example, based on a scene shown in FIG. 4 and referring to (a) of FIG. 8, the first virtual object 402 is located in the target region 406, so that a target attribute (such as a speed) of the virtual object 408 is enhanced. In this case, the target region 406 includes the first virtual object 402, and an enhancement amplitude of the target attribute (the speed) of the virtual object 408 is "+1".

Furthermore, referring to (b) of FIG. 8, the first virtual object 402 and a second virtual object 802 are both located in the target region 406, so that the enhancement amplitude of the target attribute (the speed) of the virtual object 408 becomes larger. In this case, the enhancement amplitude of the target attribute (the speed) of the virtual object 408 is "+2".

According to some embodiments, more virtual objects in the target region indicates a larger enhancement amplitude of the target attribute, so that the target attribute may be greatly enhanced in a case that a preset condition is met, thereby achieving the effect of improving the efficiency of enhancing the target attribute.

In some embodiments, in a case that the target attribute of the virtual object in the first object group is enhanced in the virtual scene, the method may further include:

displaying a target identifier corresponding to the virtual object in the first object group in the virtual scene, the target identifier being used for indicating that the target attribute of the virtual object in the first object group is being enhanced.

Since the enhancement of the target attribute ignores the range, the effect is relatively significant, which may affect balance of the virtual scene. Therefore, to maintain the balance of the virtual scene, a virtual object with an enhanced target attribute is marked by displaying the target identifier, thereby reducing concealment of the virtual object with the enhanced target attribute. For example, the target identifier may be marked on the virtual object with the enhanced target attribute, or may be displayed on a map (such as a mini map), to mark a current position of the virtual object with the enhanced target attribute, where the map may be, but is not limited to, used for representing location information of a virtual object within a preset range.

Figure 9:
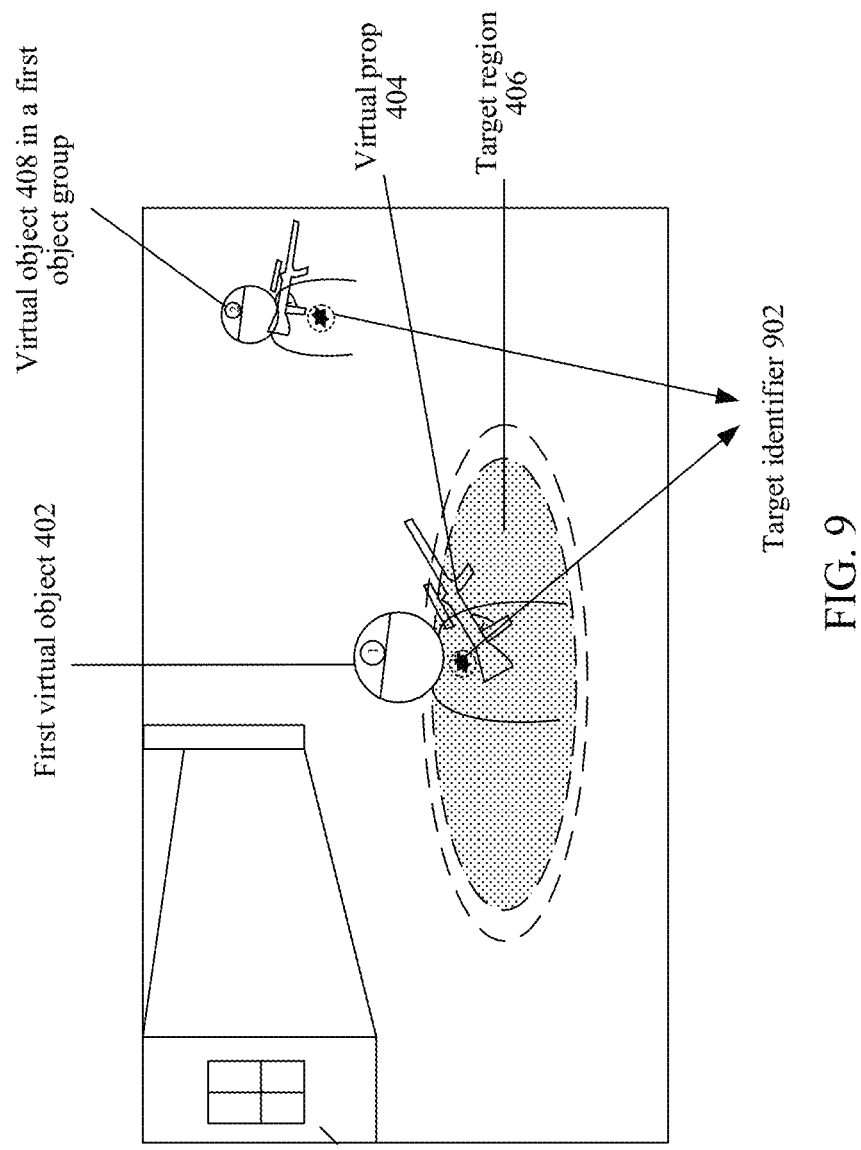
FIG. 9 is a schematic diagram of a target identifier according to some embodiments.

Further, for example, based on the scene shown in FIG. 4 and referring to FIG. 9, a target identifier 902 is displayed on the first virtual object 402 and the virtual object 408 with the enhanced target attribute.

The virtual object of which the target attribute is enhanced may include, but not limited to, all or some of virtual objects in the first object group, for example, in a case that the virtual objects of which the target attributes are enhanced are some virtual objects in the first object group, the target attributes of the virtual objects in the first object group in the target region are prohibited from being enhanced.

According to some embodiments, the concealment of the virtual object with the enhanced target attribute may be reduced, thereby achieving the effect of maintaining the balance of the virtual scene (such as a game virtual scene).

In some embodiments, in a case that the first virtual object is located in the target region, the method may further include:

performing at least one of the following operations:
displaying at least one of an orientation identifier or a location identifier of the first virtual object in a virtual scene interface (for example, a non-map interface) of a virtual object in a second object group, the second object group being different from the first object group; or displaying at least one of the orientation identifier or the location identifier of the first virtual object in a map interface of the virtual object in the second object group.

For example, the orientation identifier may be, but is not limited to, used for indicating a direction of a position at which the first virtual object is located relative to the virtual object in the second object group, for example, the orientation identifier may be an indicator identifier. In this way, the virtual object in the second object group may be instructed to move to the position of the first virtual object in a direction indicated by the orientation identifier.

For example, the location identifier may be, but is not limited to, used for indicating the position at which the first virtual object is located relative to the virtual object in the second object group. For example, a general outline of the first virtual object is displayed in the virtual scene interface (for example, a game interface shown in FIG. 14, that is, the non-map interface) of the virtual object in the second object group, the virtual object in the second object group is instructed to move to the position of the first virtual object according to a position indicated by the location identifier.

Since the enhancement of the target attribute ignores the range, the effect is relatively significant, which may affect balance of the virtual scene. Therefore, to maintain the balance of the virtual scene, an approximate position of the virtual object with the enhanced target attribute is marked by displaying an orientation or location identifier that is more clearly directed, thereby reducing concealment of the virtual object with the enhanced target attribute.

Figure 10:
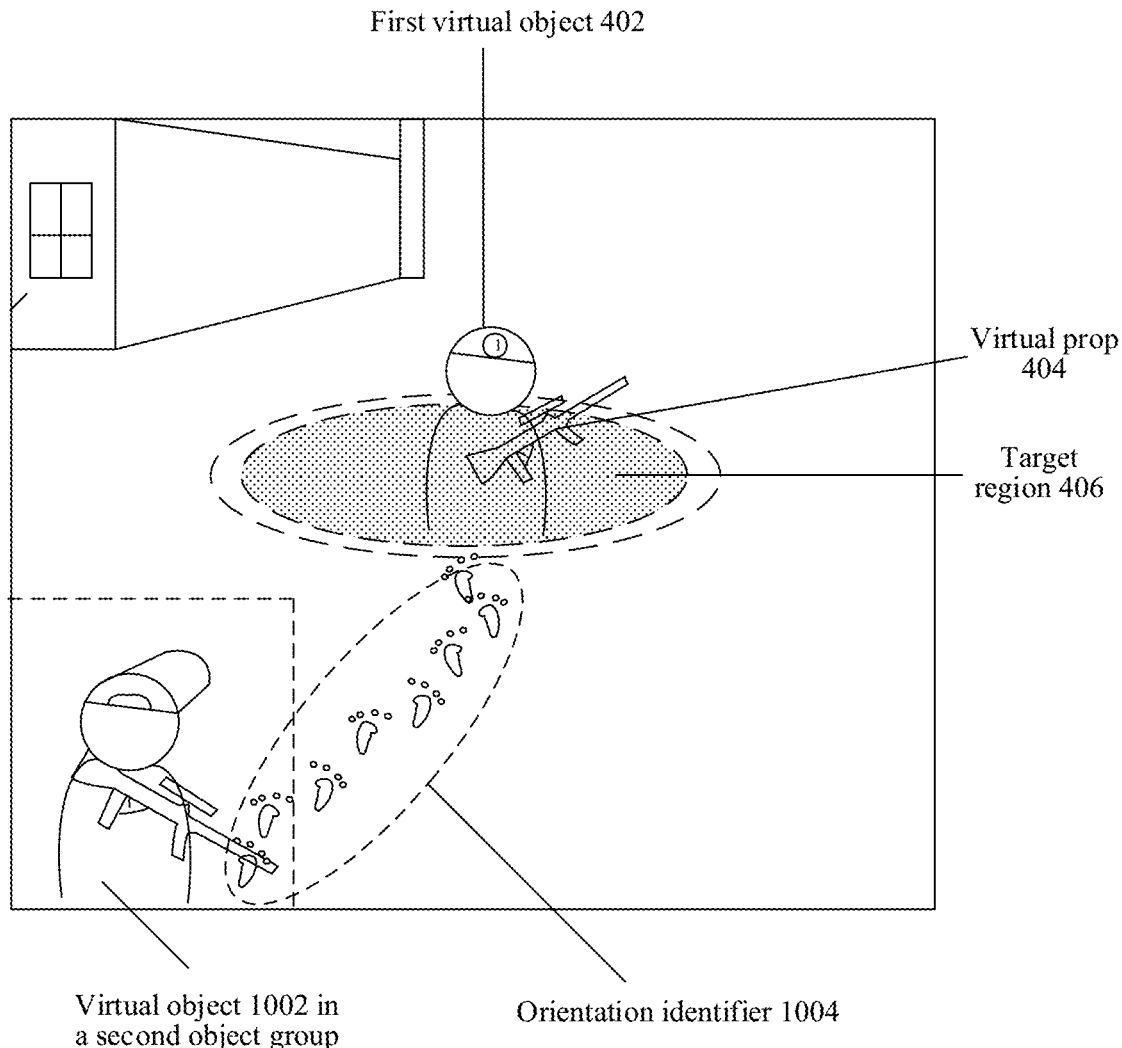
FIG. 10 is a schematic diagram of an orientation identifier according to some embodiments.

Further, for example, based on the scene shown in FIG. 4 still referring to FIG. 10, a virtual object 1002 in the second object group is hostile to the first virtual object 402 in the first object group, and the first virtual object 402 is located in the target region. In this case, an orientation identifier 1004 is displayed in a display interface (for example, a virtual scene interface) of an electronic device (such as a terminal device) that controls the virtual object 1002, to help a user that controls the virtual object 1002 quickly determine the position of the first virtual object 402.

In some embodiments, in a case that the target attribute of the virtual object in the first object group is enhanced in the virtual scene, the method may further include:

performing at least one of the following operations:
stopping enhancing the target attribute of the virtual object in the first object group in the virtual scene in a case that the first virtual object leaves the target region; or stopping enhancing the target attribute of the virtual object in the first object group in the virtual scene in a case that the first virtual object is located in the target region and the first virtual object is killed.

The stopping the enhancement of the target attribute of the virtual object may be related to the first virtual object, or may be related to the target region. For example, the enhancement of the target attribute of the virtual object is stopped in a case that one of the following conditions occurs: 1. The target region disappears. 2. The first virtual object leaves the target region. 3. The first virtual object is killed. Both the cases 2 and 3 may cause, but are not limited to, the occurrence of the case 1.

Further, for example, the enhancement of the target attribute of the virtual object is stopped in a case that the virtual object 1002 shown in FIG. 10 kills the first virtual object 402 currently located in the target region 406.

In another example, the enhancement of the target attribute of the virtual object is stopped in a case that the first virtual object 402 moves outside the target region 406 to evade the attack from the virtual object 1002.

According to some embodiments, the maintenance difficulty in enhancing the target attribute may be improved, thereby achieving the effect of maintaining the balance of the virtual scene.

In some embodiments, in a case that the target attribute of the virtual object in the first object group is enhanced in the virtual scene, the method further includes:

performing at least one of the following operations:
enhancing a first attribute of the virtual object in the first object group in the virtual scene, the first attribute being a defense attribute, and the first attribute, when enhanced, reducing damage caused by an attack operation on the virtual object in the first object group, the attack operation being performed by a virtual object in a second object group, the first object group being different from the second object group; or enhancing a second attribute of the virtual object in the first object group in the virtual scene, the second attribute being a movement attribute, and the second attribute, when enhanced, reducing a probability that the virtual object in the first object group is hit by the attack operation.

In some embodiments, the target attribute may facilitate, but not limited to, the virtual object to complete the target task (such as game characters) in the virtual scene, where the target attribute may be, for example, the defense attribute or the movement attribute.

The enhancing the target attribute may be used to, but is not limited to, reduce the damage caused by the attack operation on the virtual object in the first object group, or reduce the probability that the virtual object in the first object group is hit by the attack operation. the enhancing the target attribute (the defense attribute and/or the movement attribute) may be, but is not limited to, increasing target attribute parameters, or reducing the target attribute parameters.

In some embodiments, the enhancing the target attribute may be, but is not limited to, selectively enhancing target attributes of different types. For example, as shown in FIG. 10, in a case that a first selection operation is triggered by the first virtual object 402 through the virtual prop 404, it is determined that a to-be-enhanced target attribute is a defense attribute; and in a case that a second selection operation is triggered through the virtual prop 404, it is determined that the to-be-enhanced target attribute is a movement attribute.

According to some embodiments, target attributes of a plurality of types may be enhanced, thereby achieving the effect of improving enhancement diversity of the target attribute.

In some embodiments, in a case that the target attribute of the virtual object in the first object group is enhanced in the virtual scene, the method may further include:

performing at least one of the following operations: increasing hit points of the virtual object in the first object group in the virtual scene; improving defense power of the virtual object in the first object group in the virtual scene; or accelerating a movement speed of the virtual object in the first object group in the virtual scene.

Some embodiments may support increase of at least one of the hit points, the defense power, or the movement speed of the virtual object in the first object group in the virtual scene. In some embodiments, a process of increasing at least one of the hit points, the defense power, or the movement speed may be, but not limited to, displayed on a process interface (such as a game process interface) of the virtual scene or an attribute interface of the virtual object.

Further, for example, as shown in FIG. 7, hit points of the virtual object 408 in the first object group are increased in the virtual scene. In another example, as shown in FIG. 8(a), a speed (a movement speed) of the virtual object 408 in the first object group is accelerated in the virtual scene.

According to some embodiments, the manner of enhancing the target attribute may be enriched, thereby achieving the effect of improving enhancement diversity of the target attribute.

In some embodiments, the method may further include:

performing any one of the following operations: determining, in a case that the target position is a position on a virtual ground, that the virtual prop is allowed to be released at the target position; or determining, in a case that the target position is a position on the virtual ground and there is no obstacle in the target region on the virtual ground, that the virtual prop is allowed to be released at the target position.

To ensure the authenticity of the virtual scene, based on the physical principle of the real world, whether the target position is a position on the virtual ground is first determined, and in a case that the target position is the position on the virtual ground, it may be directly determined that the virtual prop is allowed to be released at the target position.

Alternatively, whether there is an obstacle in the target region on the virtual ground is determined on the basis of the target position being the position on the virtual ground, so as to ensure rationality of the release of the virtual prop. In a case that there is no obstacle in the target region on the virtual ground, it is determined that the virtual prop is allowed to be released at the target position; and in a case that there is an obstacle in the target region on the virtual ground, whether the obstacle meets a release condition of the virtual prop is determined, and in a case that the release condition is met, it is determined that the virtual prop is allowed to be released at the target position.

Figure 11:
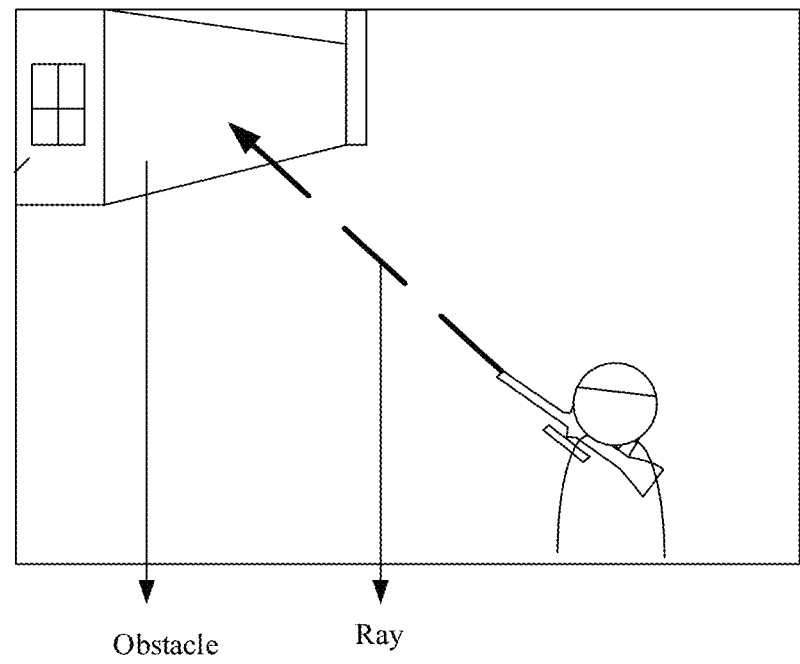
FIG. 11 is a schematic diagram of an obstacle according to some embodiments.

Further, for example, in a case that the user clicks to release the virtual prop, a ray may be emitted to a direction in which a crosshair of the virtual prop aims, and then whether the first obstacle colliding with the ray meets the release condition is detected. For example, as shown in FIG. 11, the obstacle is a wall and does not meet the release condition, and the virtual prop is not allowed to be released.

According to some embodiments, the release process of the virtual prop conforms to the physical law, so that the authenticity of the virtual scene may be improved, thereby improving user experience of the virtual scene.

In some embodiments, for ease of understanding, the method for controlling a virtual object is described below by using an example in which the method for controlling a virtual object is applied to an embodiment of a shooting game scene. For example, in the shooting game scene, a player (a virtual character controlled by the player) selects a position to release an aperture and stays in the aperture until the aperture disappears, and in this case, all teammates belonging to the same camp as the player may gain certain defense power. However, an enemy camp either waits for the aperture to disappear or kills an object that releases the aperture within the aperture, to remove the effect of boosting the defense power. When entering the aperture, the player may be exposed to attract players from the enemy camp. Therefore, the player may find a better defense place to release, thereby avoiding being killed and continuously improving the defense effect for the teammates for a long time.

Figure 12:
FIG. 12 is a schematic diagram of releasing an aperture according to some embodiments.

Further, for example, as shown in FIG. 12, the aperture may be released by using a particular skill weapon. The player may release the aperture at an appropriate position in any region, where a sufficient space is required for a place for releasing, and the player may also release in a room, which is easier to defend and hide. However, health replenishment function (using an example in which the target attribute is hit points) may take effect only in a case that the player enters the aperture.

Figure 13:
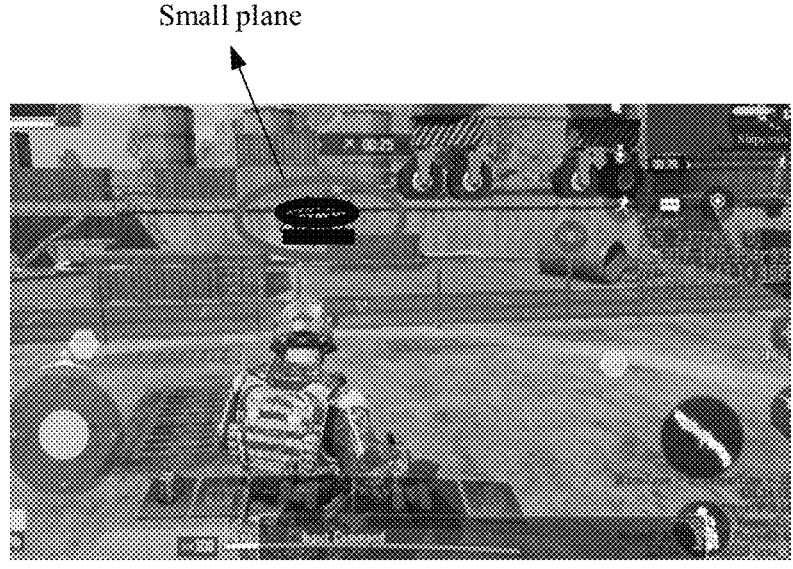
FIG. 13 is a schematic diagram of a target identifier according to some embodiments.

Furthermore, when the health replenishment function begins to take effects, each player during replenishment may be surrounded by a special effect, and a small plane may be displayed on a head and follow the player. For example, as shown in FIG. 13, both the surrounding special effect and the small plane correspond to the target identifier described above. During movement, world coordinates of each player may be obtained, and then the height is obtained. The height of each model is in the configuration, and then planned configuration offset is superimposed, so that the small plane can follow the head of the player.

Figure 14:
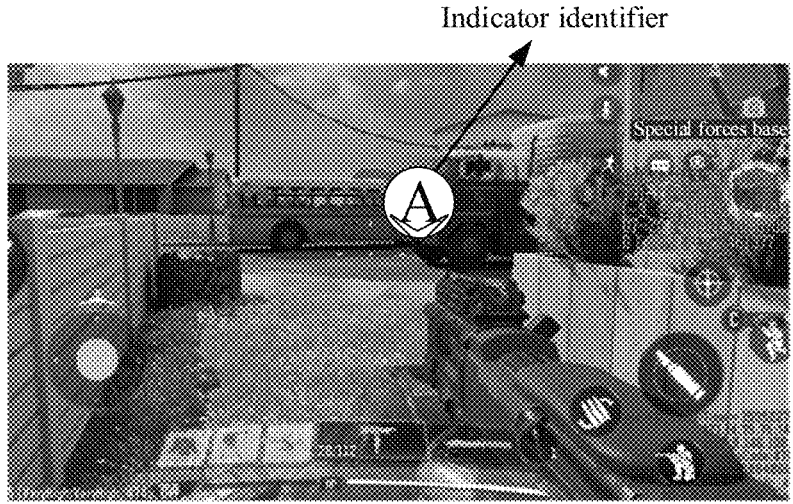
FIG. 14 is a schematic diagram of an indicator identifier according to some embodiments.
Figure 15:
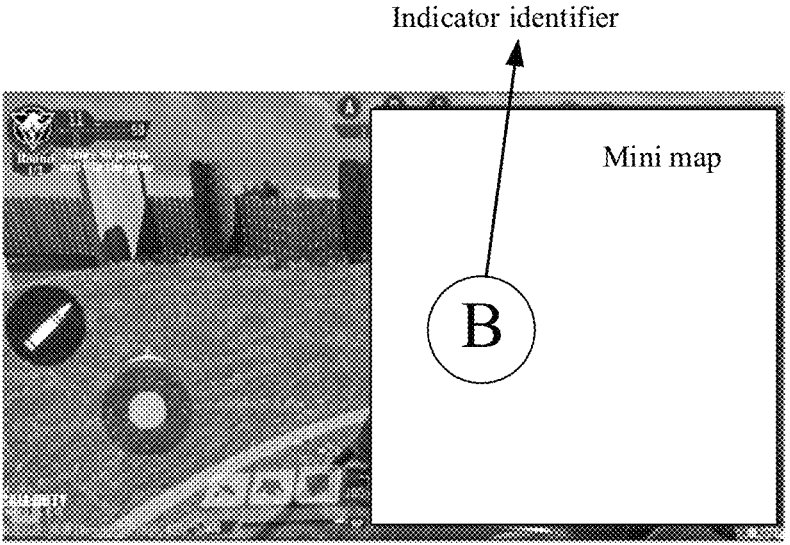
FIG. 15 is a schematic diagram of an indicator identifier according to some embodiments.

In addition, to enable the enemy camp to prevent the health replenishment function, a position of the object that releases the aperture may be exposed, for example, an indicator identifier "A" (corresponding to the foregoing orientation identifier) shown in FIG. 14 displays an approximate orientation of the object. In some embodiments, the orientation of the object may be, but is not limited to, displayed through a map (a mini map), for example, in a map shown in FIG. 15, the approximate orientation of the object is displayed in a form of an indicator identifier "B".

For ease of description, the foregoing method embodiments are stated as a series of action combinations. However, a person skilled in the art is to learn that the disclosure is not limited to the described sequence of the actions, because some operations may be performed in another sequence or may be simultaneously performed. In addition, a person skilled in the art is also to learn that the embodiments described are all optional embodiments, and the involved actions and modules are not necessarily required or limited thereto.

Figure 16:
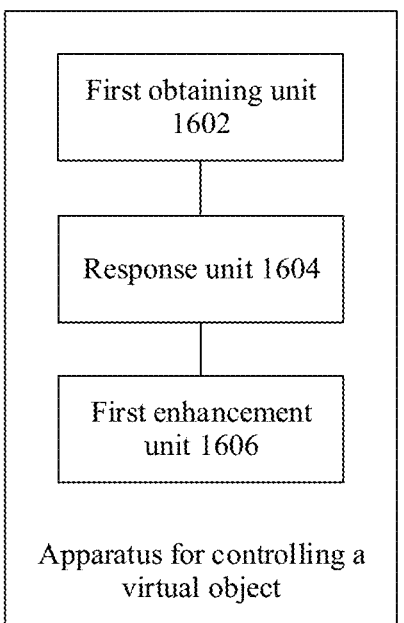
FIG. 16 is a schematic diagram of an apparatus for controlling a virtual object according to some embodiments.

Some embodiments further provide an apparatus for controlling a virtual object configured to implement the method for controlling a virtual object. As shown in FIG. 16, the apparatus includes:

a first obtaining unit 1602, configured to obtain an interactive operation in a virtual scene, the interactive operation being used for controlling a first virtual object to release a virtual prop at a target position;

a response unit 1604, configured to release the virtual prop at the target position and display a target region triggered by the virtual prop in the virtual scene, the target region including the target position; and a first enhancement unit 1606, configured to enhance a target attribute of a virtual object in a first object group in the virtual scene in a case that the first virtual object is located in the target region, the first object group being an object group to which the first virtual object belongs.

In some embodiments, the first enhancement unit 1606 includes a first enhancement module, configured to continuously enhance the target attribute of the virtual object in the first object group in the virtual scene in a case that the first virtual object remains in the target region, an enhancement parameter of the target attribute being in a positive correlation with a duration for which the first virtual object remains in the target region, and the enhancement parameter including at least one of an enhancement duration or an enhancement amplitude.

In some embodiments, the first enhancement unit 1606 includes a second enhancement module, configured to: enhance the target attribute of the virtual object in the first object group in the virtual scene at a first amplitude in a case that a second virtual object is not located in the target region; and enhance the target attribute of the virtual object in the first object group in the virtual scene at a second amplitude in a case that the second virtual object is located in the target region, the second amplitude being greater than the first amplitude, the second virtual object being a virtual object in the first object group.

In some embodiments, the apparatus may further include a first display unit, configured to display a target identifier corresponding to the virtual object in the first object group in the virtual scene, the target identifier being used for indicating that the target attribute of the virtual object in the first object group is being enhanced.

In some embodiments, the apparatus may further include a second display unit, configured to perform at least one of the following operations: displaying at least one of an orientation identifier or a location identifier of the first virtual object in a virtual scene interface of a virtual object in a second object group, the second object group being different from the first object group; or displaying at least one of the orientation identifier or the location identifier of the first virtual object in a map interface of the virtual object in the second object group.

In some embodiments, the apparatus may further include a stop unit, configured to stop enhancing the target attributes of the virtual objects in the first object group in the virtual scene in a case that a stop condition is met, the stop condition including at least one of the following: the first virtual object leaves the target region; the first virtual object is located in the target region and the first virtual object is killed; the first virtual object is located in the target region and the first virtual object is attacked; a virtual object in a second object group completes a target task in the virtual scene, the second object group being different from the first object group; the virtual object in the second object group obtains a display picture in which the first virtual object is located in the target region; an existing duration of the target region reaches a preset duration; an attribute value of the target attribute reaches a maximum attribute value; or the target region stops displaying.

In some embodiments, the first enhancement unit 1606 includes a second enhancement module, configured to perform at least one of the following operations: enhancing a first attribute of the virtual object in the first object group in the virtual scene, the first attribute being a defense attribute, and the first attribute, when enhanced, reducing damage caused by an attack operation on the virtual object in the first object group, the attack operation being performed by a virtual object in a second object group, the first object group being different from the second object group; or enhancing a second attribute of the virtual object in the first object group in the virtual scene, the second attribute being a movement attribute, and the second attribute, when enhanced, reducing a probability that the virtual object in the first object group is hit by the attack operation. In some embodiments, the first enhancement unit 1606 is further configured to perform at least one of the following operations: increasing hit points of the virtual object in the first object group in the virtual scene; improving defense power of the virtual object in the first object group in the virtual scene; accelerating a movement speed of the virtual object in the first object group in the virtual scene; or decreasing a negative status parameter of the virtual object in the first object group in the virtual scene.

In some embodiments, the apparatus may further include a determining module, configured to perform any one of the following operations: determining, in a case that the target position is a position on a virtual ground, that the virtual prop is allowed to be released at the target position; determining, in a case that the target position is a position on the virtual ground and there is no obstacle in the target region on the virtual ground, that the virtual prop is allowed to be released at the target position; or determining, in a case that the target position is a position on the virtual ground and there is an obstacle in the target region on the virtual ground, whether the obstacle meets a release condition of the virtual prop, and determining, in a case that the obstacle meets the release condition, that the virtual prop is allowed to be released at the target position.

Figure 17:
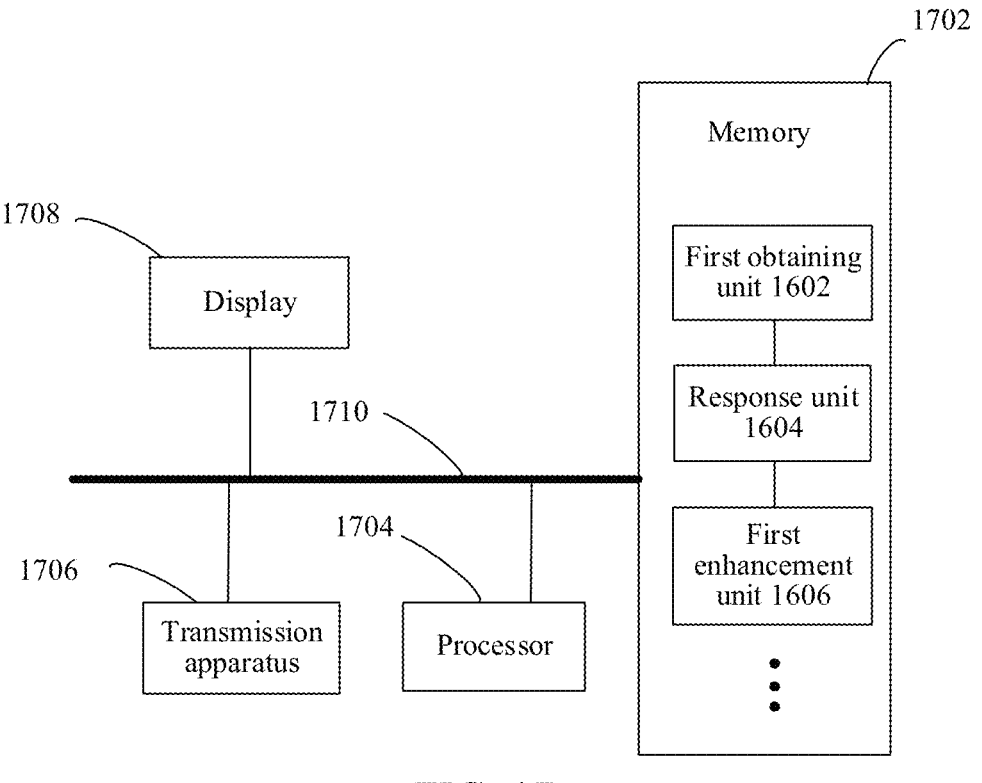
FIG. 17 is a schematic structural diagram of an electronic device according to some embodiments.

Some embodiments further provides an electronic device configured to implement the method for controlling a virtual object. As shown in FIG. 17, the electronic device includes a memory 1702 and a processor 1704. The memory 1702 stores a computer program, and the processor 1704 is configured to perform the operations in any method embodiment through the computer program.

In some embodiments, the electronic device may be located in at least one of a plurality of network devices in a computer network.

In this embodiment, the processor may be configured to perform the following operations by using the computer program:

obtaining an interactive operation in a virtual scene, the interactive operation being used for controlling a first virtual object to release a virtual prop at a target position; releasing the virtual prop at the target position and displaying a target region triggered by the virtual prop in the virtual scene, the target region including the target position; and enhancing a target attribute of a virtual object in a first object group in the virtual scene in a case that the first virtual object is located in the target region, the first object group being an object group to which the first virtual object belongs.

In some embodiments, a person of ordinary skill in the art may understand that, the structure shown in FIG. 17 is only illustrative. The electronic device may be a terminal device such as a smartphone (such as an Android mobile phone or an iOS mobile phone), a tablet computer, a palmtop computer, a MID, or a PAD. FIG. 17 does not limit the structure of the electronic device. For example, the electronic device may further include more or fewer components (such as a network interface) than those shown in FIG. 17, or have a configuration different from that shown in FIG. 17.

The memory 1702 may be configured to store a software program and a module, for example, a program instruction/module corresponding to the virtual object control method and apparatus in the embodiments, and the processor 1704 performs various functional applications and data processing by running the software program and the module stored in the memory 1702, that is, implementing the foregoing virtual object control method. The memory 1702 may include a high-speed random access memory, and may also include a non-volatile memory, for example, one or more magnetic storage apparatuses, a flash memory, or another non-volatile solid-state memory. In some embodiments, the memory 1702 may further include memories remotely disposed relative to the processor 1704, and the remote memories may be connected to a terminal through a network. Examples of the network include, but are not limited to, the Internet, an intranet, a local area network, a mobile communication network, and a combination thereof. The memory 1702 may specifically store, but is not limited to, information such as an interactive operation, object groups, a target region, and a target attribute. In an example, as shown in FIG. 17, the memory 1702 may include, but is not limited to, a first obtaining unit 1602, a response unit 1604, and a first enhancement unit 1606 in the apparatus for controlling the virtual object. In addition, the memory may also include, but is not limited to, other modules and units in the virtual object control apparatus, which will not be elaborated in this example In some embodiments, the electronic device includes a transmission apparatus 1706 configured to receive or send data through a network. Specific instances of the foregoing network may include a wired network and a wireless network. In an example, the transmission apparatus 1706 includes a network interface controller (MC). The NIC may be connected to another network device and a router by using a network cable, so as to communicate with the Internet or a local area network. In an example, the transmission apparatus 1706 is a radio frequency (RF) module, which communicates with the Internet in a wireless manner.

In addition, the electronic device further includes a display 1708, configured to display the information such as the interactive operation, the object groups, the target region, and the target attribute. A connection bus 1710, configured to connect various module components in the electronic device.

In other embodiments, the terminal device or server may be a node in a distributed system. The distributed system may be a blockchain system. The blockchain system may be a distributed system formed by the plurality of nodes connected in the form of network communication. The nodes may form a peer to peer (P2P) network. Electronic devices in any form, for example, electronic devices such as a server and a terminal, can join the P2P network to become a node in the blockchain system.

Some embodiments provide a computer program product or a computer program. The computer program product or the computer program includes computer instructions (or the computer program), and the computer instructions are stored in a non-transitory computer-readable storage medium. A processor of the electronic device reads the computer instructions from the computer-readable storage medium, and the processor executes the computer instructions, to cause the electronic device to perform the method for controlling a virtual object, where the computer program is configured to perform, when run, the operations in any method embodiment described above.

In some embodiments, the non-transitory computer-readable storage medium may be configured to store a computer program configured to perform the following operations: obtaining an interactive operation in a virtual scene, the interactive operation being used for controlling a first virtual object to release a virtual prop at a target position; releasing the virtual prop at the target position and displaying a target region triggered by the virtual prop in the virtual scene, the target region including the target position; and enhancing a target attribute of a virtual object in a first object group in the virtual scene in a case that the first virtual object is located in the target region, the first object group being an object group to which the first virtual object belongs.

In some embodiments, a person of ordinary skill in the art may understand that all or some of the operations of the methods in the foregoing embodiments may be implemented by hardware or a program instructing relevant hardware of the electronic device. The program may be stored in a computer-readable storage medium. The storage medium may include a flash disk, a read-only memory (ROM), a random access memory (RAM), a magnetic disk, an optical disk, and the like.

The sequence numbers of the foregoing embodiments are merely for description purposes, and are not intended to indicate the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions essentially, or the part contributing to the related art, or all or some of the technical solutions may be implemented in a form of a software product. The computer software product is stored in a storage medium and includes several instructions for instructing one or more electronic devices (which may be a personal computer, a server, a network device, and the like) to perform all or some of the operations of the methods described in the embodiments of the disclosure.

In the foregoing embodiments, descriptions of the embodiments have respective focuses. As for parts that are not described in detail in one embodiment, reference may be made to the relevant descriptions of the other embodiments.

In some embodiments, it is to be understood that, the disclosed client may be implemented in another manner. The described apparatus embodiment is merely exemplary. For example, the unit division is merely logical function division and may be other division during actual implementation. For example, a plurality of units or components may be combined or integrated into another system, or some features may be ignored or not performed. In addition, the coupling, or direct coupling, or communication connection between the displayed or discussed components may be the indirect coupling or communication connection by means of some interfaces, units, or modules, and may be electrical or of other forms.

The units described as separate components may or may not be physically separate, and components displayed as units may or may not be physical units, may be located in one position, or may be distributed on a plurality of network units. Some or all of the units may be selected according to actual requirements to achieve the objectives of the solutions of the embodiments.

In addition, functional units in some embodiments may be integrated into one processing unit, or each of the units may exist alone physically, or two or more units may be integrated into one unit. The integrated unit may be implemented in a form of hardware, or may be implemented in a form of a software functional unit.

The foregoing descriptions are merely some implementations of the disclosure. A person of ordinary skill in the art may further make several improvements and modifications without departing from the principle of the disclosure, and the improvements and modifications fall within the protection scope of the disclosure.

What is claimed is:

1. A method performed by an electronic device, the method comprising:

executing an augmented reality game application such that the virtual scene is outputted as a three-dimensional (3D) projection;

obtaining an interactive operation in the virtual scene, the interactive operation being used for controlling a first virtual object to release a virtual prop at a target position that is at a distance from the virtual prop in the virtual scene;

aiming the virtual prop toward the target position such that a line is extended from the virtual prop to the target position;

releasing, via a trigger release, the virtual prop that is aimed towards the target position, and upon releasing the virtual prop, displaying in the virtual scene a target region triggered by the virtual prop in the virtual scene, the target region comprising the target position at the distance from the virtual prop and an area surrounding the target position; and enhancing a target attribute of a second virtual object in a first object group in the virtual scene in a case that the first virtual object is located in the target region, the first object group being an object group to which the first virtual object belongs.

2. The method according to claim 1, wherein the enhancing comprises:

continuously enhancing the target attribute of the second virtual object in the first object group in the virtual scene in a case that the first virtual object remains in the target region, an enhancement parameter of the target attribute being in a positive correlation with a duration for which the first virtual object remains in the target region, and the enhancement parameter comprising at least one of an enhancement duration or an enhancement amplitude.

3. The method according to claim 1, wherein the enhancing comprises:

enhancing the target attribute of the second virtual object in the first object group in the virtual scene according to an attribute parameter of the virtual prop, an enhancement parameter of the target attribute being in a positive correlation with the attribute parameter of the virtual prop, and the enhancement parameter comprising at least one of an enhancement duration or an enhancement amplitude.

4. The method according to claim 1, wherein the enhancing comprises:

enhancing the target attribute of the second virtual object in the first object group in the virtual scene at a first amplitude in a case that a third virtual object is not located in the target region; and enhancing the target attribute of the second virtual object in the first object group in the virtual scene at a second amplitude in a case that the third virtual object is located in the target region, the second amplitude being greater than the first amplitude, the third virtual object being a virtual object in the first object group.

5. The method according to claim 1, wherein in a case that the target attribute of the second virtual object in the first object group is enhanced in the virtual scene, the method further comprises:

displaying a target identifier corresponding to the second virtual object in the first object group in the virtual scene, the target identifier being used for indicating that the target attribute of the second virtual object in the first object group is being enhanced.

6. The method according to claim 5, wherein the displaying comprises:

performing at least one of the following operations:

marking the target identifier on the second virtual object in the first object group, and displaying the target identifier in the virtual scene; or displaying the target identifier corresponding to the second virtual object in the first object group in a map interface of the virtual scene.

7. The method according to claim 1, wherein in a case that the first virtual object is located in the target region, the method further comprises:

performing at least one of the following operations:

displaying at least one of an orientation identifier or a location identifier of the first virtual object in a virtual scene interface of a third virtual object in a second object group, the second object group being different from the first object group; or displaying at least one of the orientation identifier or the location identifier of the first virtual object in a map interface of the third virtual object in the second object group.

8. The method according to claim 1, wherein in a case that the target attribute of the second virtual object in the first object group is enhanced in the virtual scene, the method further comprises:

stopping enhancing the target attribute of the second virtual object in the first object group in the virtual scene in a case that a stop condition is met, the stop condition comprising at least one of the following:

the first virtual object leaves the target region;

the first virtual object is located in the target region and the first virtual object is killed;

the first virtual object is located in the target region and the first virtual object is attacked;

a third virtual object in a second object group completes a target task in the virtual scene, the second object group being different from the first object group;

the third virtual object in the second object group obtains a display picture in which the first virtual object is located in the target region;

an existing duration of the target region reaches a preset duration;

an attribute value of the target attribute reaches a maximum attribute value; or the target region stops displaying.

9. The method according to claim 1, wherein in a case that the target region triggered by the virtual prop is displayed in the virtual scene, the method further comprises:

performing at least one of the following operations:

stopping displaying the target region in the virtual scene in a case that the first virtual object leaves the target region; or stopping displaying the target region in the virtual scene in a case that the first virtual object is killed.

10. The method according to claim 1, wherein the enhancing comprises:

performing at least one of the following operations:

enhancing a first attribute of the second virtual object in the first object group in the virtual scene, the first attribute being a defense attribute, and the first attribute, when enhanced, reducing damage caused by an attack operation on the second virtual object in the first object group, the attack operation being performed by a third virtual object in a second object group, the first object group being different from the second object group; or enhancing a second attribute of the second virtual object in the first object group in the virtual scene, the second attribute being a movement attribute, and the second attribute, when enhanced, reducing a probability that the second virtual object in the first object group is hit by the attack operation.

11. The method according to claim 1, wherein the enhancing comprises:

performing at least one of the following operations:

increasing hit points of the second virtual object in the first object group in the virtual scene;

improving defense power of the second virtual object in the first object group in the virtual scene;

accelerating a movement speed of the second virtual object in the first object group in the virtual scene; or decreasing a negative status parameter of the second virtual object in the first object group in the virtual scene.

12. The method according to claim 1, wherein the enhancing comprises:

determining a selection operation triggered by the first virtual object through the virtual prop; and enhancing, in the virtual scene, a target attribute of the second virtual object in the first object group that corresponds to the selection operation, different selection operations corresponding to different target attributes.

13. The method according to claim 1, wherein the releasing comprises:

releasing the virtual prop at the target position in a case that the virtual prop is allowed to be released at the target position.

14. The method according to claim 13, further comprising:

performing any one of the following operations:

determining, in a case that the target position is a position on a virtual ground, that the virtual prop is allowed to be released at the target position;

determining, in a case that the target position is the position on the virtual ground and there is no obstacle in the target region on the virtual ground, that the virtual prop is allowed to be released at the target position; or determining, in a case that the target position is the position on the virtual ground and there is an obstacle in the target region on the virtual ground, whether the obstacle meets a release condition of the virtual prop, and determining, in a case that the obstacle meets the release condition, that the virtual prop is allowed to be released at the target position.

15. The method according to claim 14, further comprising:

emitting a ray in a direction where a crosshair of the virtual prop aims; and using a first obstacle colliding with the ray as the obstacle in the target region.

16. The method according to claim 1, further comprising:

performing any one of the following operations:

determining the target position according to a release manner of the virtual prop, the release manner comprising at least one of a crosshair, a direction, or a position; or determining the position of the first virtual object at which the first virtual object is controlled to release the virtual prop as the target position.

17. The method according to claim 1, further comprising:

performing any one of the following operations:

using a region centered on the target position as the target region; or using an effect display region in which the virtual prop is released as the target region.

18. The method according to claim 1, wherein the enhancing comprises:

performing any one of the following operations:

enhancing, in the virtual scene, a target attribute of a third virtual object in the first object group that is different from the first virtual object;

simultaneously enhancing, in the virtual scene, a target attribute of the first virtual object and the target attribute of the third virtual object in the first object group that is different from the first virtual object; or enhancing, in the virtual scene, a target attribute of the third virtual object in the first object group that is not located in the target region.

19. An apparatus comprising:

at least one memory configured to store program code; and at least one processor configured to read the program code and operate as instructed by the program code, the program code comprising:

executing code configured to cause the at least one processor to execute an augmented reality game application such that the virtual scene is outputted as a three-dimensional (3D) projection;

aiming code configured to cause the at least one processor to aim the virtual prop toward the target position such that a line is extended from the virtual prop to the target position;

first obtaining code configured to cause the at least one processor to obtain an interactive operation in the virtual scene, the interactive operation being used for controlling a first virtual object to release a virtual prop at a target position that is at a distance from the virtual prop in the virtual scene, the virtual scene displayed during execution of the augmented reality game application, the virtual scene displayed on a display screen of the electronic device that is a wearable head mount device or outputted as a three-dimensional (3D) projection by the electronic device;

response code configured to cause the at least one processor to release, via a trigger release, the virtual prop that is aimed towards the target position, and upon releasing the virtual prop, display in the virtual scene a target region triggered by the virtual prop in the virtual scene, the target region comprising the target position at the distance from the virtual prop and an area surrounding the target position; and first enhancement code configured to cause the at least one processor to enhance a target attribute of a virtual object in a first object group in the virtual scene in a case that the first virtual object is located in the target region, the first object group being an object group to which the first virtual object belongs.

20. A non-transitory computer-readable storage medium, storing computer program that when executed by at least one processor causes the at least one processor to:

executing an augmented reality game application such that the virtual scene is outputted as a three-dimensional (3D) projection;

obtain an interactive operation in the virtual scene, the interactive operation being used for controlling a first virtual object to release a virtual prop at a target position that is at a distance from the virtual prop in the virtual scene;

aim the virtual prop toward the target position such that a line is extended from the virtual prop to the target position;

release, via a trigger release, the virtual prop that is aimed towards the target position, and upon releasing the virtual prop, displaying in the virtual scene a target region triggered by the virtual prop in the virtual scene, the target region comprising the target position at the distance from the virtual prop and an area surrounding the target position; and enhance a target attribute of a second virtual object in a first object group in the virtual scene in a case that the first virtual object is located in the target region, the first object group being an object group to which the first virtual object belongs.

* * * * *